United States Patent [19]

Hudson et al.

[11] Patent Number: 5,459,921
[45] Date of Patent: Oct. 24, 1995

[54] METHOD OF MAKING A DISC DRIVE ACTUATOR ARM WITH ARM COMPLIANCE COMPENSATION

[75] Inventors: Andrew J. Hudson, Santa Cruz; Michael J. Raffetto, Scotts Valley, both of Calif.

[73] Assignee: Seagate Technology, Inc., Scotts Valley, Calif.

[21] Appl. No.: 152,210

[22] Filed: Nov. 12, 1993

[51] Int. Cl.[6] ............................................. G11B 5/42
[52] U.S. Cl. ............................ 29/603; 360/104; 360/106
[58] Field of Search ..................... 29/603; 360/104–106

[56] References Cited

U.S. PATENT DOCUMENTS

| | | |
|---|---|---|
| 4,783,710 | 11/1988 | Salyer et al. . |
| 4,829,395 | 5/1989 | Coon et al. . |
| 4,853,812 | 8/1989 | Daito et al. . |
| 4,922,456 | 5/1990 | Yamaguchi . |
| 5,047,883 | 9/1991 | Aldrich et al. . |
| 5,053,904 | 10/1991 | Yamano et al. . |
| 5,138,507 | 8/1992 | Zarouri et al. . |
| 5,153,794 | 10/1992 | Hinlein . |
| 5,184,265 | 2/1993 | Foote et al. . |
| 5,227,937 | 7/1993 | Magnusson et al. . |

*Primary Examiner*—Carl E. Hall
*Attorney, Agent, or Firm*—Flehr, Hohbach, Test Albritton & Herbert

[57] ABSTRACT

Method and apparatus for compensating for different gram loads and actuator arm resonances by positioning z-height of outer actuator arm at an optimum height. Specifically, an actuator arm driven by a closed loop servo motor system for a disc drive system is configured so that the outer upper and lower actuator arms are positioned at an optimum distance, called optimum z-height, from the disc surface. At the optimum z-height position, the resonances of the outer actuator arms are shifted as near as possible to the resonances of the inner actuator arms. At the optimum z-height, the gram loads on the head gimbal assemblies of the inner and outer actuator arms are closest for all z-heights measured. Accordingly, degradation of the performance of the servo motor system will be reduced.

10 Claims, 15 Drawing Sheets

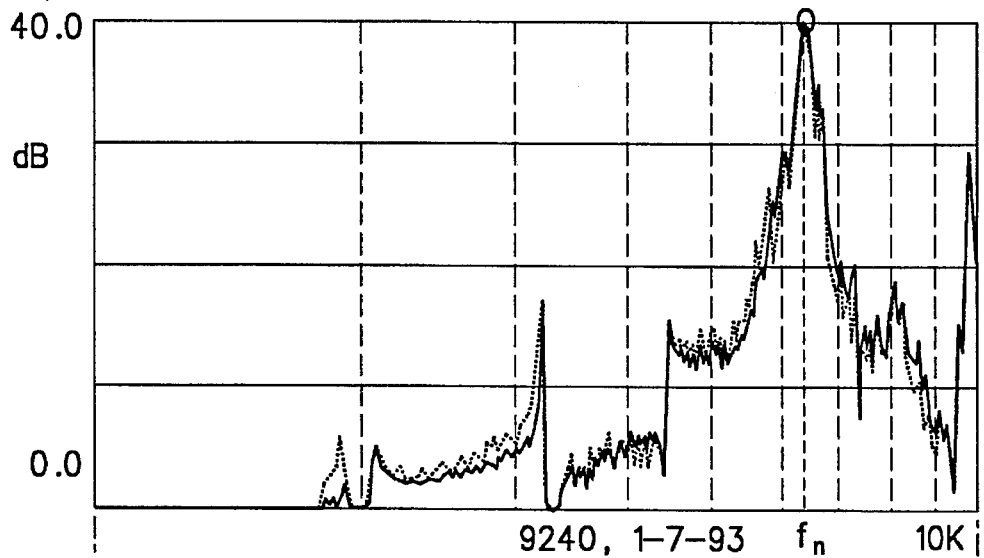
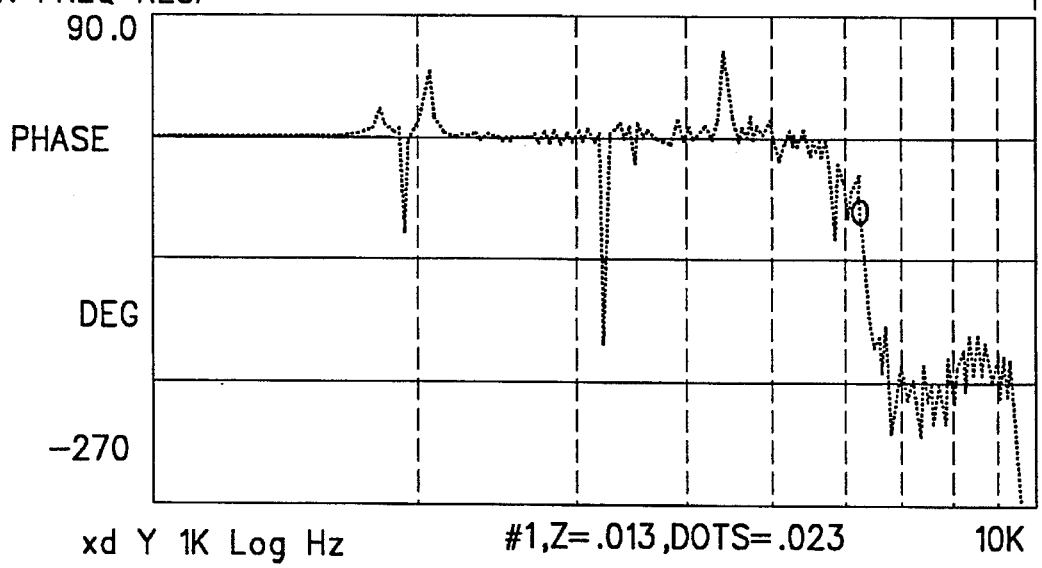
FIG. 8

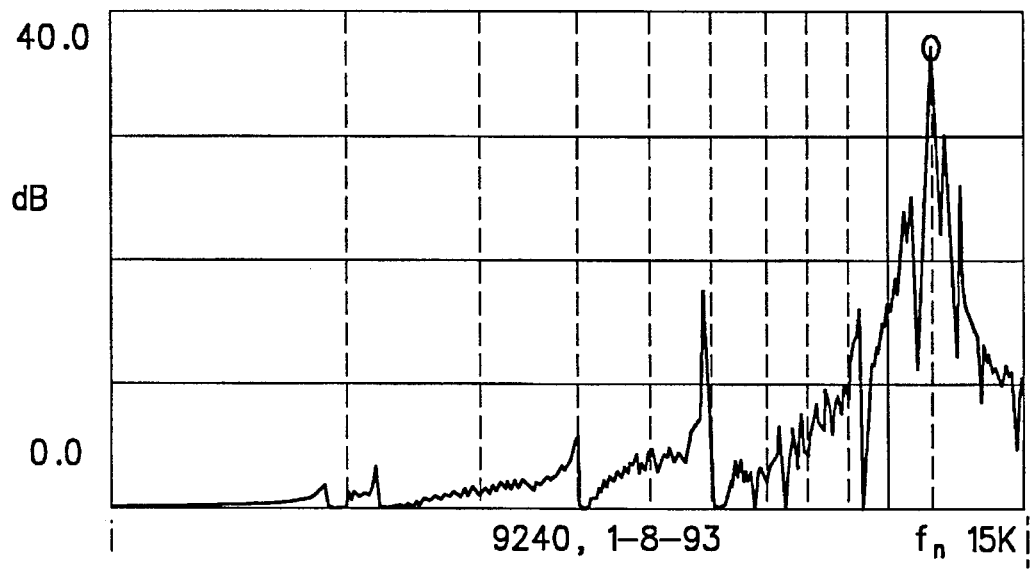
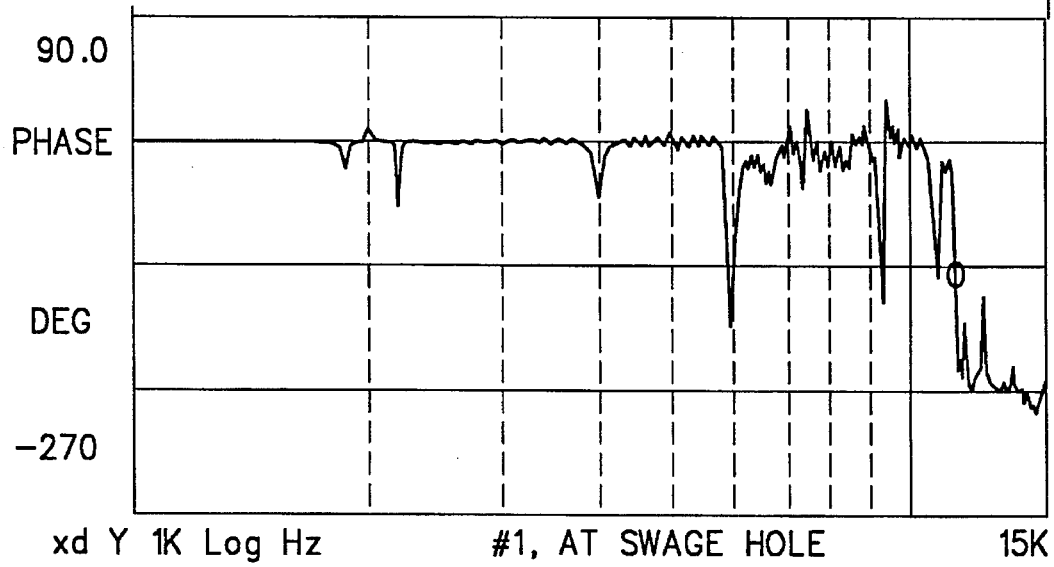
FIG. 9

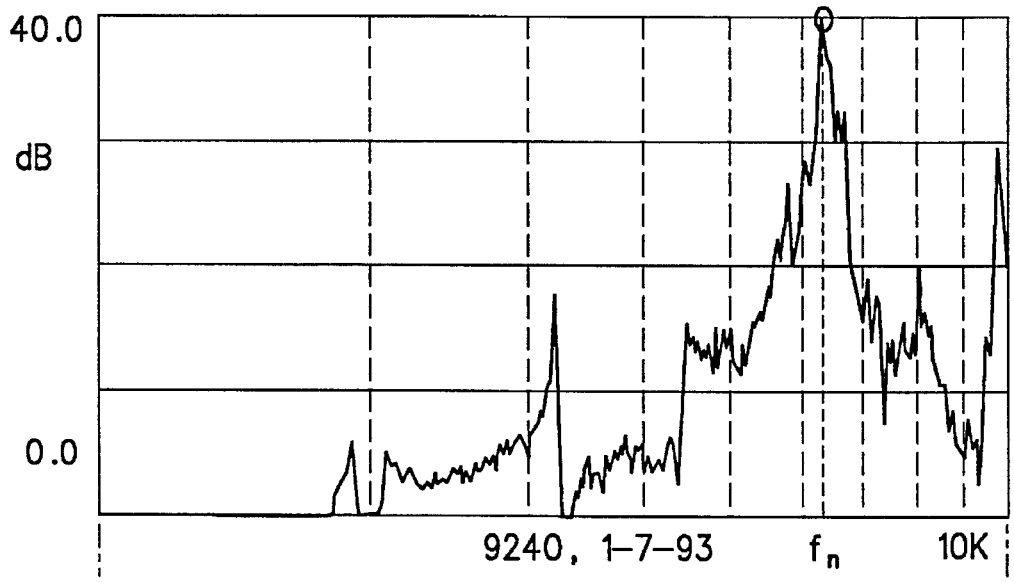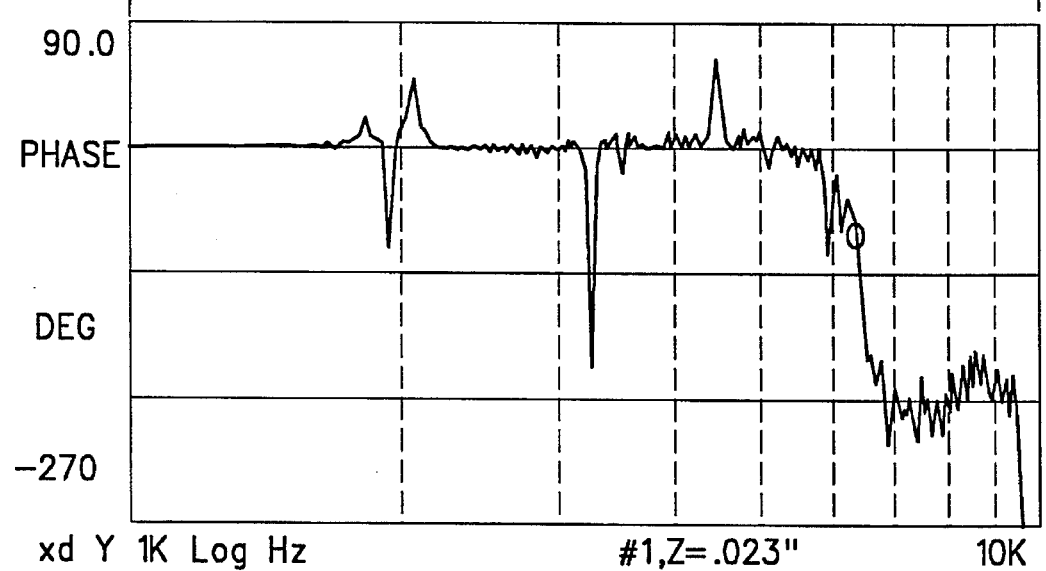
FIG. 10

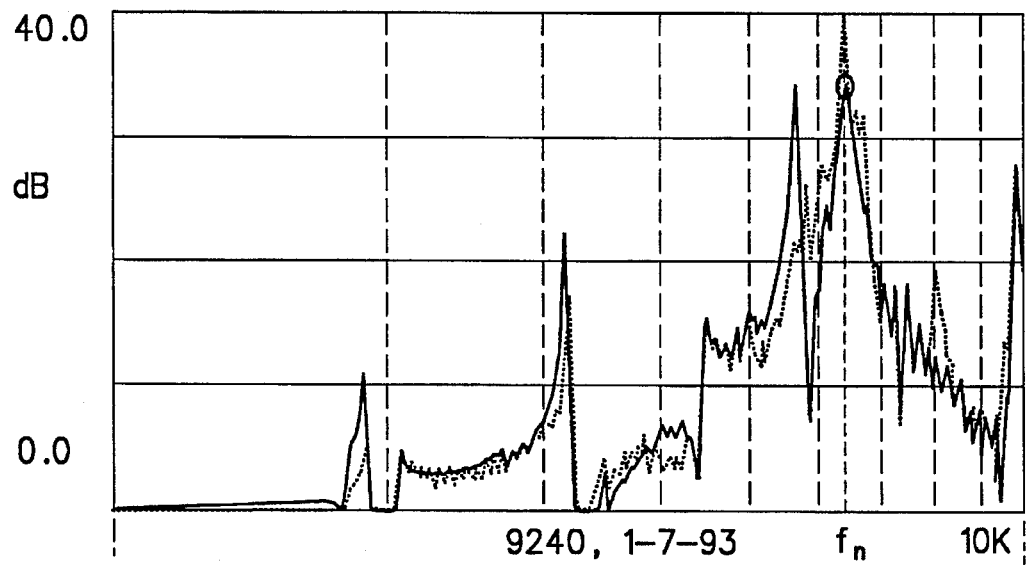
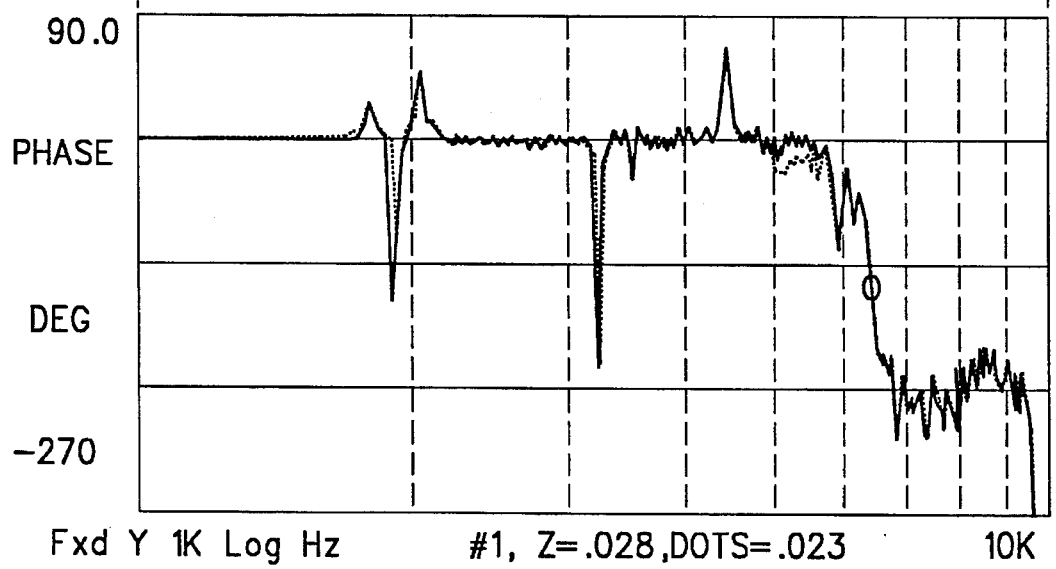
FIG. 11

X=6.4195kHz
Yₐ=35.6263 dB
M: FREQ RESP
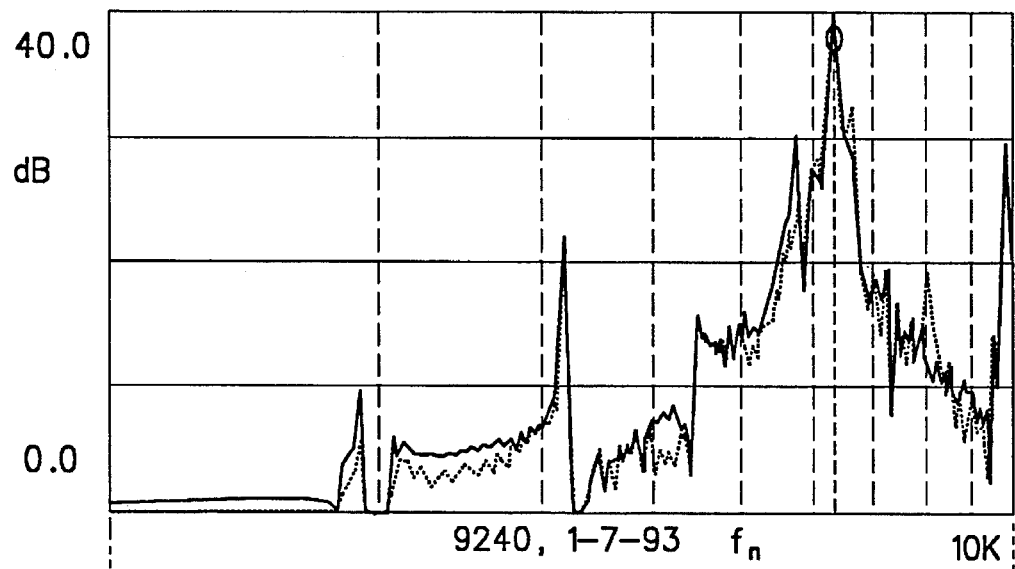
Fxd Y 1K Log Hz
b=−107.18 Deg
M: FREQ RESP
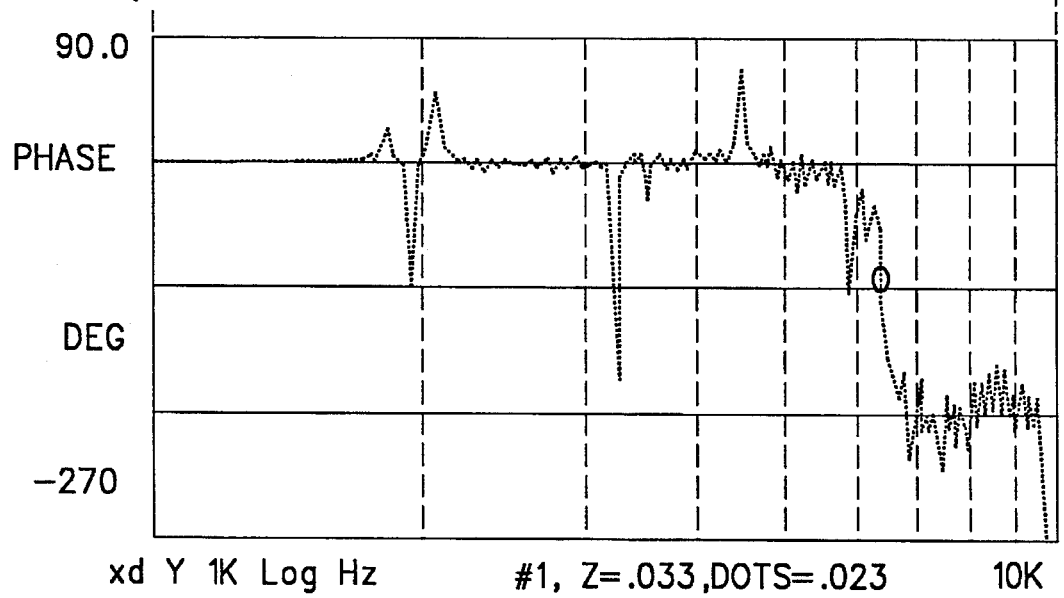
xd Y 1K Log Hz           #1, Z=.033,DOTS=.023
*FIG. 12*

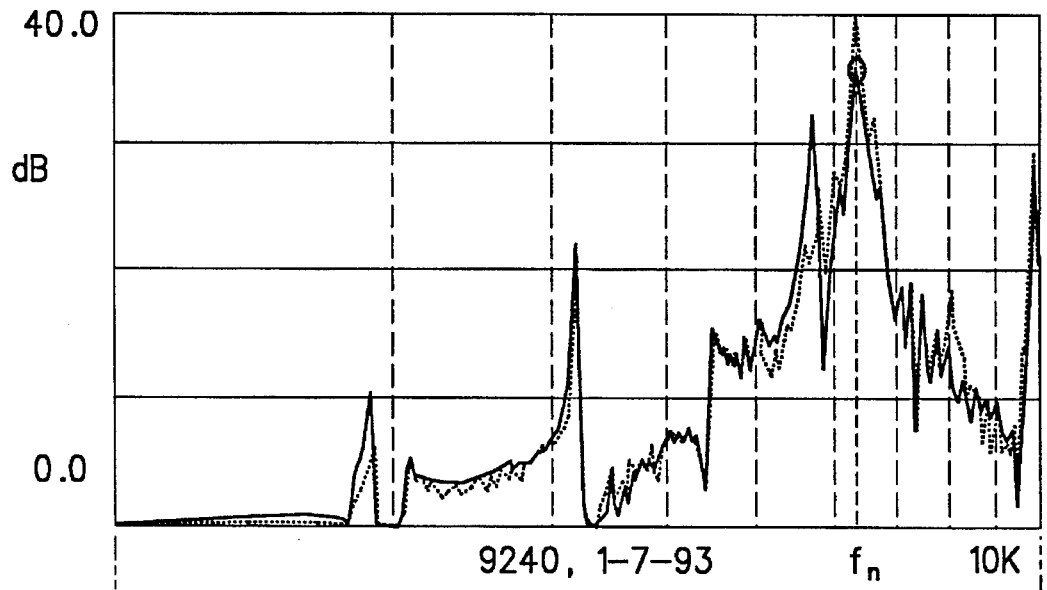
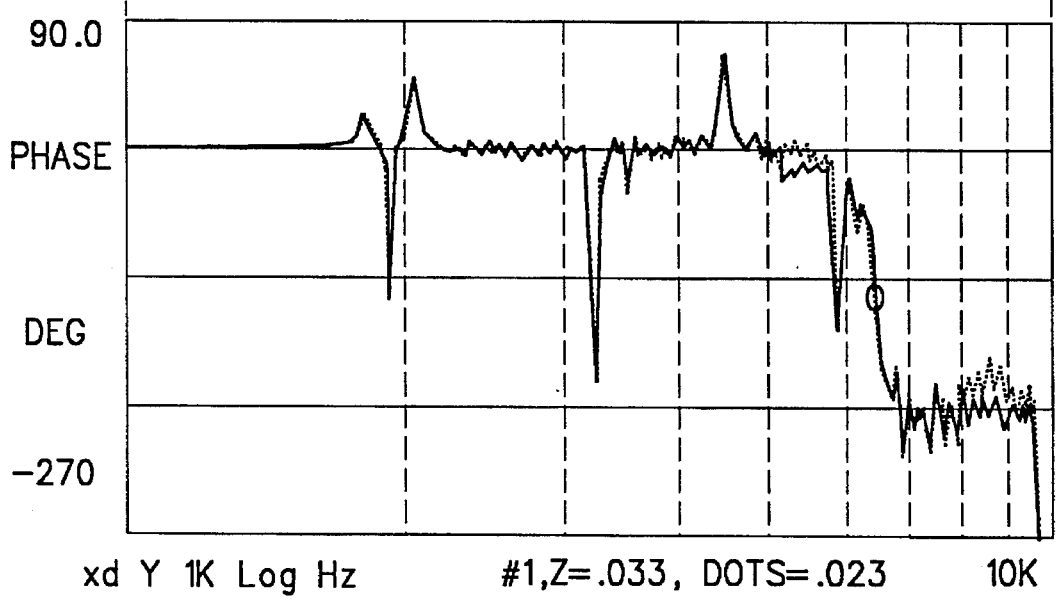
FIG. 13

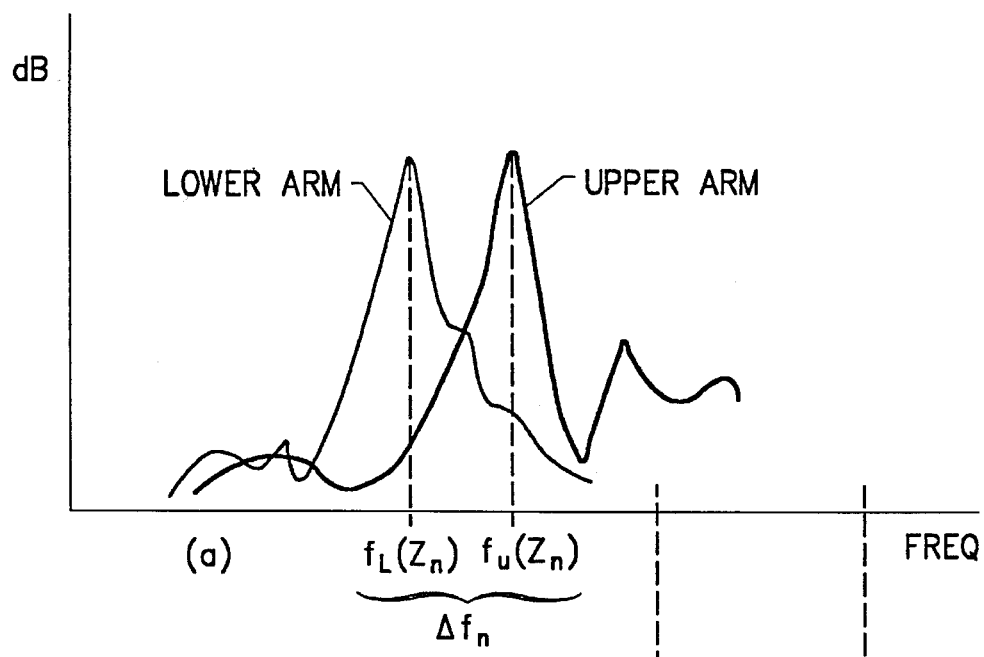
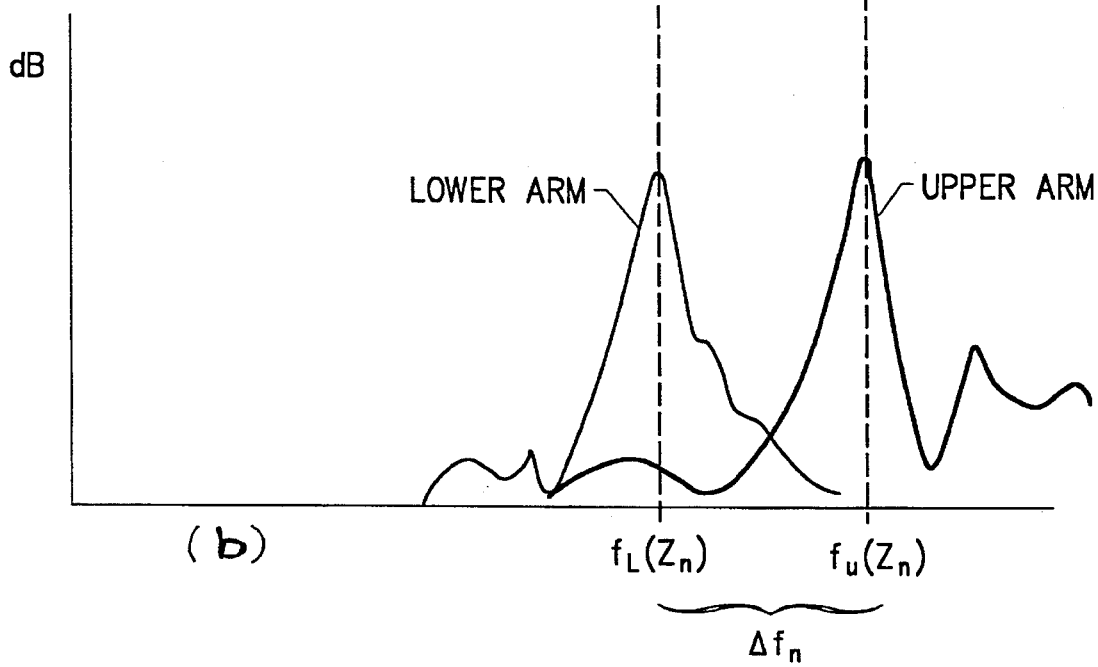
FIG. 15

METHOD OF MAKING A DISC DRIVE ACTUATOR ARM WITH ARM COMPLIANCE COMPENSATION

BACKGROUND OF THE INVENTION

1. Field of the Invention

The invention relates generally to an actuator arm apparatus in a disc drive system and to a method of installing the outer actuator arms at a particular optimum distance from the memory disc surface of their corresponding memory discs to compensate for the differences in gram loads on the head gimbal assembly and improve the performance of the servo motor system.

2. Description of Prior Art

Disc drive systems read and write information stored on concentric circular tracks on memory discs. Information or data is stored on the surface of the memory discs via a read/write media. The data is divided or grouped together in tracks. Transducers, in the form of read/write heads, located on both sides of the memory disc, read and write information on the memory discs when they are accurately positioned over one of the designated or target tracks on the surface of the memory disc. As the memory disc spins and the read/write head is accurately positioned above a target track, the read/write head can store data onto a track by writing onto the memory disc in a particular manner. Similarly, reading data on a memory disc is accomplished by positioning the read/write head above a target track and reading the stored material on the memory disc. To write on or read from different tracks, the read/write head is moved radially across the concentric tracks to the target track.

Typical disc drives have a plurality of memory discs spaced apart and rotating about a common spindle. Because of the importance of positioning the read/write head substantially parallel to the memory disc surface, a head gimbal assembly is installed on an actuator arm. An actuator arm comprises a flexure, a head gimbal assembly, and a mounting support. The read/write head is found at the distal end of the actuator arm. The proximal end of the actuator arm is coupled to a pivot assembly. The pivot assembly is in turn connected to a servo motor system. The flexure and head gimbal assembly allow the read/write head to gimbal for pitch and roll to follow fluctuations in the imperfect memory disc surface but restrict motion in the radial and circumferential directions of the memory disc. The flexure is coupled to an mounting support coupled to a servo motor. As the disc drive system sends control signals to the motor, the motor rotates, thereby displacing the actuator arm supporting the read/write head across the memory disc in a radial direction to the target track. The control signals indicate to the motor the magnitude and direction of the displacement.

Disc drive systems are very high precision units requiring close dimensional tolerances in manufacturing. In recent years, the size of disc drives have decreased from a 14-inch form factor to 1.8-inch form factor. In contrast, the density of information (bits per inch and tracks per inch) stored on memory discs compatible with such disc drives has increased. To meet the increased density requirements, the recording performance of the read/write head must be optimized. The performance of the read/write head is a function of the distance between the head and the disc surface where the data is stored. Currently, this spacing must be typically 3.0 microinches.

Fly-height refers to this spacing as the disc rotates and the read/write head "flies" across the disc surface to position itself over the target track. To ensure proper performance, the head must maintain this fly-height of 3.0 microinches. Fly height is determined by gram load, pitch static attitude, and the appropriate placement of the actuator arm over the disc surface (z-height).

Gram load refers to the load on the head gimbal assembly. When the disc is rotating, no gram load is applied to the head gimbal assembly. When the disc has ceased rotating, a portion of the head gimbal assembly makes contact with the disc surface and as a result, gram load is applied to the head gimbal assembly. The z-height of the mounting support affects the gram load; the lower the z-height, the greater the gram load.

Pitch static attitude refers to the ability of the read/write head to "ride" with the fluctuations of the laminar flow of air generated by disc rotation and with the uneven disc surface. More particularly, pitch refers to the vertical angular displacement of the head about the horizontal plane of its "flight path." The read/write head is mounted on a "slider" which has an air bearing surface positioned immediately adjacent the flat surface of the memory disc. As the memory disc spins, the laminar flow of air following the memory disc lifts the slider and the read/write head by applying vertical air pressure onto the air bearing surface of the slider. Ideally, any displacements in distance by the slider are negligible compared to the distance of the actuator arm from the disc surface.

Actuator arms act as spring-mass-damper systems and have resonant frequencies that can degrade the performance of the servo system. Every closed loop servo motor system has a predetermined bandwidth in which resonances occurring within the bandwidth degrade the performance of the servo motor system. A key source of unwanted resonances is the actuator arm. Accordingly, the bandwidths of most servo motor systems are designed such that resonances of the actuator arm occur outside the bandwidth. Each actuator arm has a unique resonance characteristic.

Almost all disc drive systems have at least two actuator arms. In many single disc drive systems, the two outer actuator arms are not accompanied by any inner actuator arms. In many disc drive systems, an outer upper actuator arm and an outer lower actuator arm are accompanied by at least one pair of inner actuator arms. Because most inner actuator arms are installed in a back-to-back configuration, their resonance characteristics are static and fairly equivalent to each other. The outer actuator arms, however, are not installed in a back-to-back configuration and are thus less stable in smaller, thinner actuator arms; the outer actuator arms are free to deflect upon an application of force. As a result, the resonance characteristics, gram load, and pitch of the head gimbal assemblies of the outer actuator arms are different from those of the head gimbal assemblies of the inner actuator arms. Not only is the shape of these resonances distinct but they occur in different locations along the frequency spectrum. Note that in imbedded servo motor systems, the resonance characteristics of each of the inner actuator arms are equivalent and the resonance characteristics of each of the outer actuator arms are equivalent.

If the two groups of actuator arms, the outer upper and lower arms and the inner back-to-back configured arms, resonate at different points along the frequency spectrum, the servo motor system will perform in a less than optimal fashion. These resonances detrimentally affect stability (in the form of shock resistance and feedback vibrations transmitted to the servo motor system) and, to a lesser degree, access times (time required to position the read/write head above the target track). Accordingly, performance of the disc drive system will deteriorate and stability will decrease. The servo motor system cannot accurately position the read/write head over the target track and additional rotation of the motor is needed to correct alignment errors.

Tilt of the flexure arm about the mounting support also affects certain resonances. Tilt is the angular deflection of a flexure about the horizontal plane (vertical deflection). Tilt is not the deflection of the flexure along the horizontal plane.

Prior art has not attempted to equalize the gram loads of the head gimbal assembly of the outer actuator arms and the gram loads of the head gimbal assembly of the inner actuator arms. Since prior art actuator arms were thicker and possessed greater mass, different gram loads on the head gimbal assembly, and thus different resonance characteristics, were not a major problem. However, with lower profile disc drives utilizing thinner and lightweight actuator arms, different gram loads on the head gimbal assemblies have emerged as a significant problem.

Prior art has attempted to minimize the effects of the outer and inner actuator arm resonances by increasing the mass or stiffness of the actuator arm or designing new SEEK methods of positioning the read/write head over the target track. These prior art did not attempt to use the existing actuator arm or a lightweight assembly and adjust the z-height to minimize the negative consequences of distinct arm resonances.

Increasing the mass or stiffness of the actuator arm attenuates, to some degree, the resonances of the arm. However, these heavier arms require higher power requirements to drive the motor. From a manufacturing standpoint, higher mass assemblies reduce manufacturing yields and increase part cost. The use of various part dimensions (e.g., different sizes of the slider for upper and lower actuator arms) also did not address directly the alignment of the resonances to increase performance and stability.

Higher mass assemblies also imply less stability in the form of head lift-off. Head lift-off, or vertical shock resistance, is a function of gram load and magnitude of vertical shock impulses. When a large shock impulse in the vertical direction is applied to the actuator arm, the head gimbal assembly "lifts off" and lands back on the disc surface. This damages the memory disc. Damage potential is lower for higher gram loads. By reducing the gram load, the damage threshold is decreased for equivalent shock impulses and thus, the stability of the disc drive system decreases.

New SEEK head positioning methods do not address resonances or stability. Although low access times may be achieved, the performance of the servo motor is still degraded due to unwanted and uncompensated resonances of the outer actuator arms.

SUMMARY OF THE INVENTION

An objective of the present invention is to achieve optimum servo motor performance for any actuator arm by increasing its stability. Such increased stability may be achieved by aligning the resonances of the inner actuator arms with the resonances of the outer actuator arms close together along the frequency spectrum.

Another objective of the present invention is to allow the use of thin and lightweight actuator arms without degrading the performance of the servo motor. Accordingly, the invention promotes lower profile disc drive systems.

A further objective of the present invention is to promote the use of interchangeable component parts for the actuator arms.

These and other objectives are achieved in accordance with the present invention. An embodiment of the present invention shows that positioning the two outer actuator arms at a particular distance, called the optimum z-height, from the memory disc surface of their corresponding memory discs would shift outer actuator arm resonances as close as possible to the resonances of the inner actuator arms to increase stability and promote the improved performance of the servo motor system. Additionally, the use of lightweight and thin material and identical dimensions for corresponding actuator arm components is possible for economic packaging of the disc drive system without sacrificing performance. As long as the outer actuator arms are positioned at the optimum z-height, degradation of performance due to mismatched actuator arm vibration resonances is minimized.

Since the present invention uses lower mass and lower inertia actuator arms, stability increases, access speed increases, and power requirements to drive the arms decrease.

BRIEF DESCRIPTION OF THE DRAWINGS

The features and advantages of the present invention will be better understood by reference to the following figures and the detailed description which follows.

FIGS. 8–14 are some Bode and Phase plots of the actuator arms of the preferred embodiment showing how the actuator arms act as a spring-mass-damper system having resonant frequencies that can degrade the performance of the servo system. More particularly, FIG. 8 is a frequency response plot of the outer actuator arms when z-height=0.013 inch.

FIG. 9 is a frequency response plot of the outer actuator arms when the mounting support of each of the outer actuator arms is positioned above the memory disc surface at an optimum z-height=0.0205 inch.

FIG. 10 is a frequency response plot of the outer actuator arms when z-height=0.023 inch.

FIG. 11 is a frequency response plot of the outer actuator arms when z-height=0.028 inch.

FIG. 12 a frequency response plot of the outer actuator arms when z-height=0.033 inch.

FIG. 13 is a frequency response plot of the outer actuator arms when z-height=0.038 inch.

FIG. 14 is a frequency response plot of the inner actuator arms.

FIG. 15, comprised of 15(a) and 15(b), shows resonance characteristics for disc drive systems with no inner actuator arms.

DETAILED DESCRIPTION OF PREFERRED EMBODIMENTS

Figure 1:
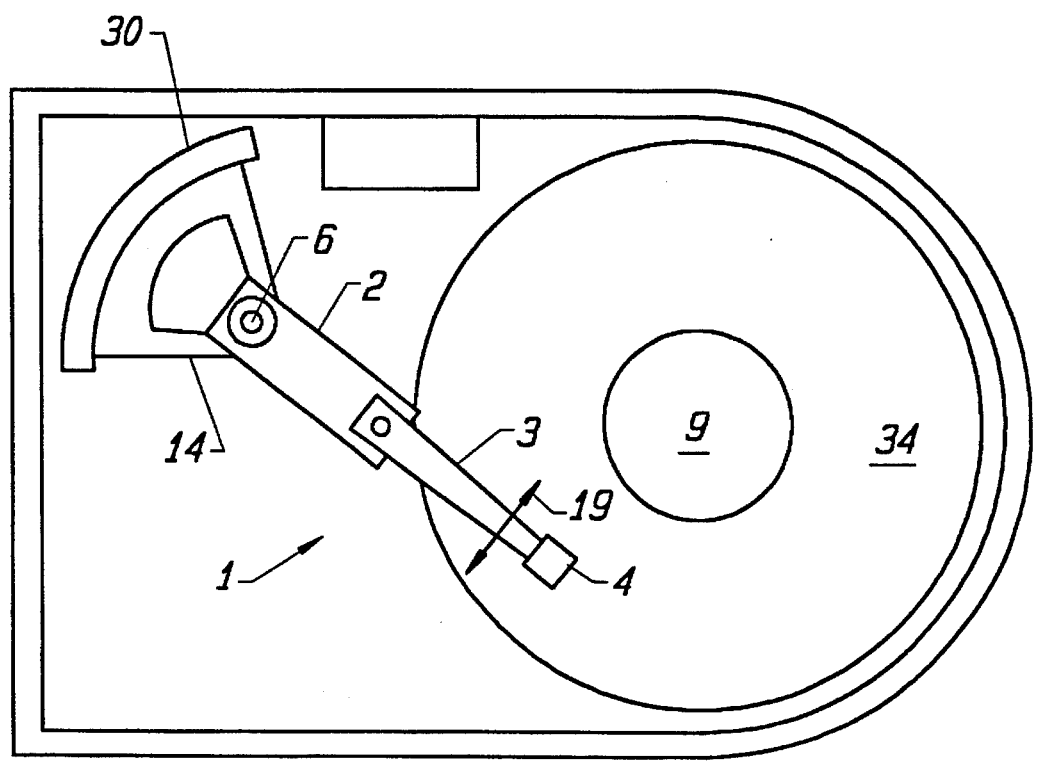
FIG. 1 is a top plan view of a disc drive system with a single/actuator arm.
Figure 2:
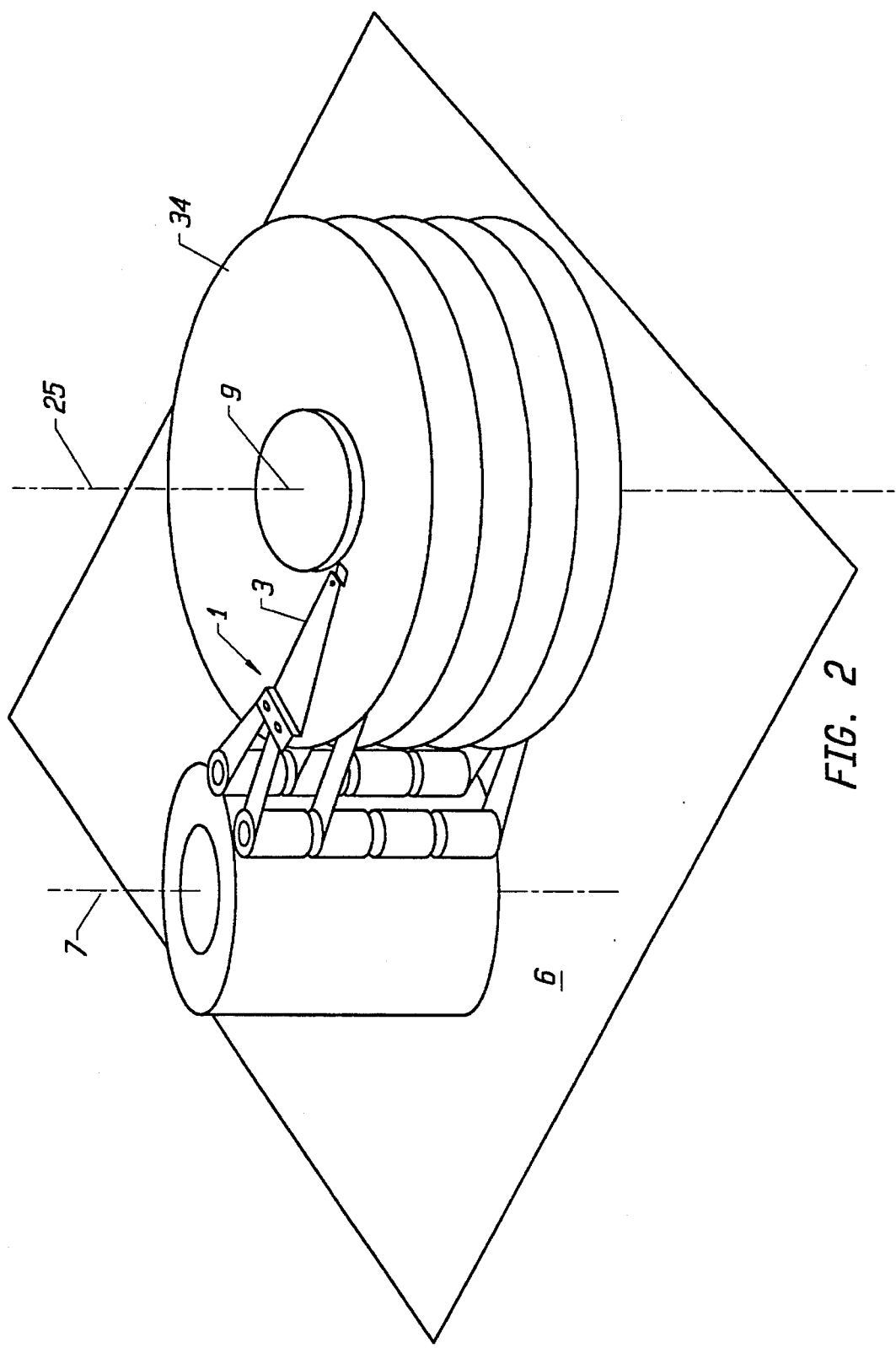
FIG. 2 is an isometric view of a portion of a stacked actuator arm disc drive system.

FIGS. 1 and 2 show the key components of a single disc drive system and a stacked multiple disc drive system, respectively. In FIG. 1, an actuator arm 1 comprises an mounting support 2, a load beam or flexure 3, and a read/write head gimbal assembly 4. The motor assembly 30 comprises a voice coil motor of a type commonly used in modern disc drives. The motor assembly could be a stepper motor that is commonly used in older disc drives. Movement of an actuator drive arm 14 moves the read/write head gimbal assembly 4 radially across the tracks on the memory disc 34 until the read/write head settles on the target track. The movement of the actuator arm 1 containing the read/write head gimbal assembly 4 is shown by the arrow 19.

However, in a different configuration as depicted in FIG. 2, the pivot assembly 6 is spatially mounted within the motor assembly 30. Here, the pivot assembly 6 is also the motor support shaft. The type of actuator motor system or assembly does not affect the novelty of the present invention. In fact, optimal z-heights are obtained for all possible combinations of various motor assemblies/systems, actuator arms, materials and dimensions used for the various disc drive components. Placement of the outer actuator arm resonances as close as possible to the resonances of the inner actuator arms along the frequency spectrum increases stability of the system. By utilizing z-height compensation, the teachings of the present invention are realized.

Figure 3:
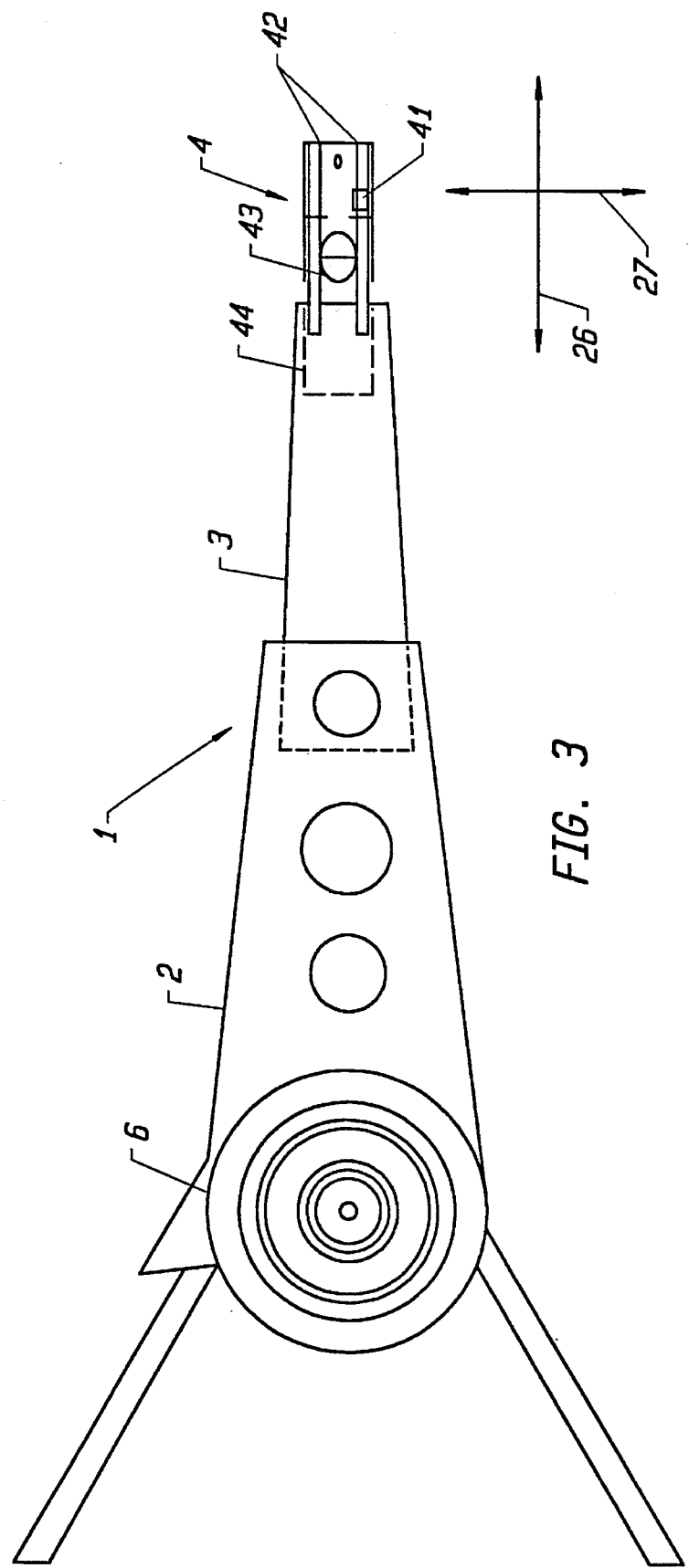
FIG. 3 is a top plan view of the inventive actuator arm showing a downwardly facing read/write head.

FIG. 3 shows a close up top plan view of a read/write head gimbal assembly 4. A gimbal 44 is coupled to the flexure 3. A dimple 43 is coupled to the gimbal 44 at one end and a read/write head 41 and a slider 42 at the other end in such a manner that the read/write head 41 and slider 42 can pitch and roll with respect to disc surface fluctuations. However, the coupling is such that movement of the read/write head gimbal assembly 4 in the radial direction 27 and circumferential direction 26 is restricted.

Figure 4:
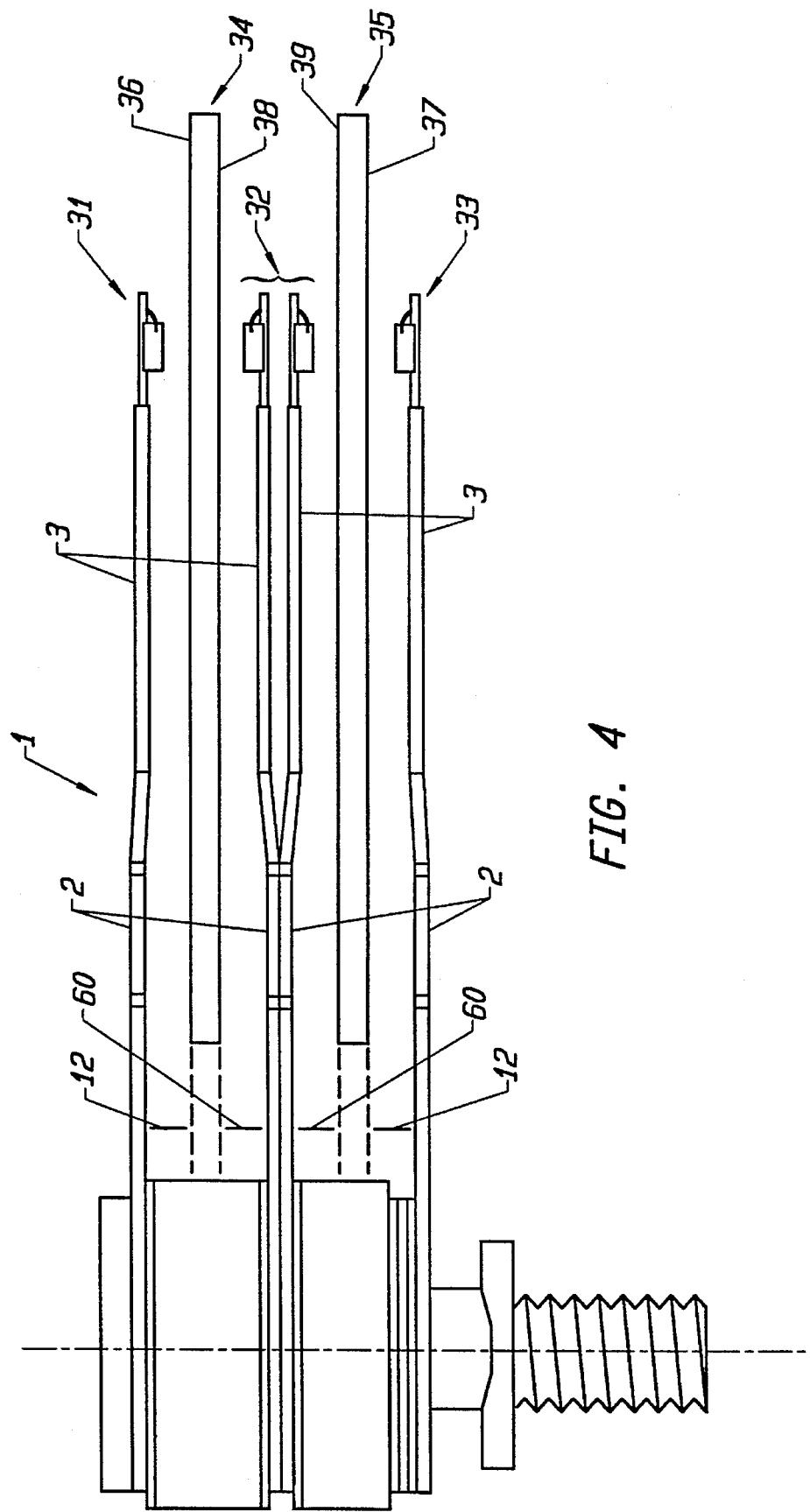
FIG. 4 is a close-up edge view of the inventive actuator arm showing the optimum z-height with reference to a memory disc.

FIG. 4 shows a close-up edge view of a stacked disc drive system. The outer upper actuator arm 31 and outer lower actuator arm 33 are positioned a particular z-height 12 from the plane of the disc surface 36 or 37 of the memory disc 34 or 35. The z-height 12 is measured from the surface of the mounting support 2 to the plane of the disc surface 36 or 37 of their corresponding memory ,disc 34 or 35. So, z-height 12 is constant for a given disc drive system and is measured from the bottom surface of the mounting support 2 of the outer upper actuator arm 31 to the disc surface 36 of its corresponding memory disc 34. Similarly, the z-height 12 is also measured from the top surface of the mounting support 2 of the outer lower actuator arm 33 to the disc surface 37 of its corresponding memory disc 35.

Figure 5:
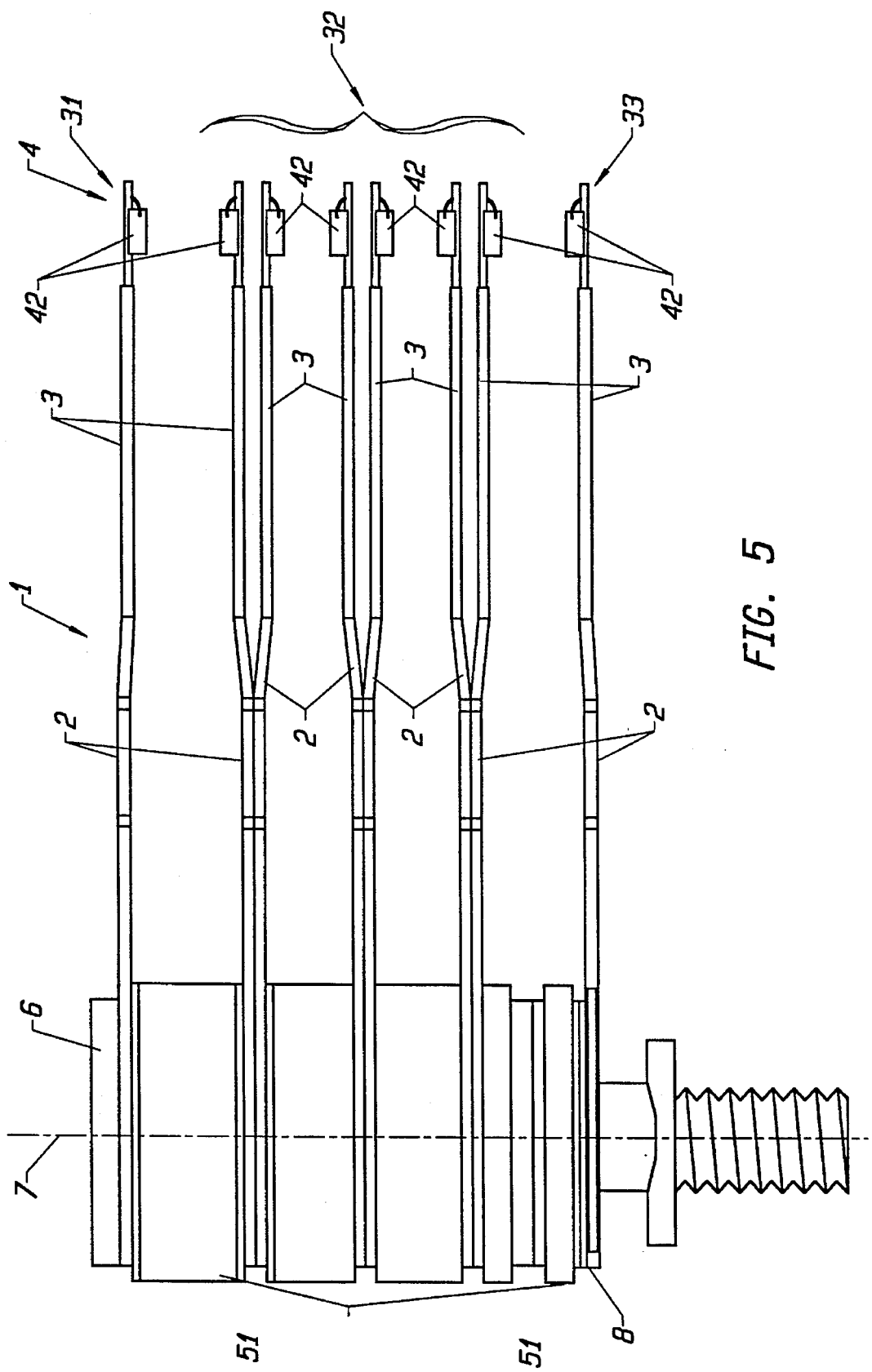
FIG. 5 is an edge view of the inventive actuator arm.

As shown in FIG. 5, adjusting the z-height is accomplished by spacers 51 that are normally installed in a pivot assembly 6 coaxial to a pivot axis 7. Different height spacers 51 result in different z-height 12 (see FIG. 4) of the mounting support.

The inner actuator arms 32 are paired together and each arm in the pair is in contact with the other arm in the pair in a back-to-back configuration. Such a configuration prevents deflection of the inner actuator arms because each inner actuator arm resists the force applied by the other inner actuator arm. z-height compensation is inapplicable to the inner actuator arms in a back-to-back configuration. Any adjustment in the distance between one of the inner actuator arms and the disc surface does not shift the resonances of that inner actuator arm. However, a distance 60 denoted as a pseudo z-height of the inner actuator arms is different from an optimal z-height 12 of the outer actuator arms. The pseudo z-height 60 of the inner actuator arms is measured from the surface of the mounting support 2 to the plane-of the disc surface 38 or 39 of their corresponding memory disc 34 or 35. FIG. 4 shows only one pair of inner actuator arms 32. However, more inner actuator arms may be stacked as shown in FIG. 5 as long as each pair of inner actuator arms are installed in a back-to-back configuration.

During a SEEK sequence, the read/write head 41 is initially positioned at a particular track. In response to control signals, the servo motor drive shaft 15 rotates. In FIG. 2, the rotation of the motor drive shaft 15 on the pivot assembly 6 around the pivot axis 7 defines the proportional movement of the read/write head 41 radially across the concentric tracks of the memory disc 34 to the target track. During this SEEK sequence, the memory disc 34 rotates about an spindle axis 25 on a spindle 9. The actuator arm 1 which supports the read/write head 41 moves and thus vibrates due to forces generated by the servo motor system.

The present invention allows the use of thin, lightweight, and uniform materials for the actuator arm. Thin materials allow the disc drive to have a lower profile. Additionally, by an embodiment of this invention, actuator arm manufacturing yields are increased thus promoting high volume and low cost manufacturing.

Lightweight materials promote faster access times and lower power requirements to drive the servo motor system. Lightweight materials at the read/write head gimbal assembly 4 reduce the gram load of the outer actuator arm.

Each component of the actuator arm are, in one embodiment of this invention, identical in dimension to its corresponding component in another actuator arm. For example, in the embodiment of FIG. 4, the flexure of the outer upper actuator arm 31 is substantially identical in dimension and material to the flexure 3 of the inner actuator arm 32 and the outer lower actuator arm 33. This allows high volume manufacturing and reduces the need for complicated testing. Interchangeability of outer and inner actuator arms simplifies assembly, rework, testing, and increases yield.

Figure 6:
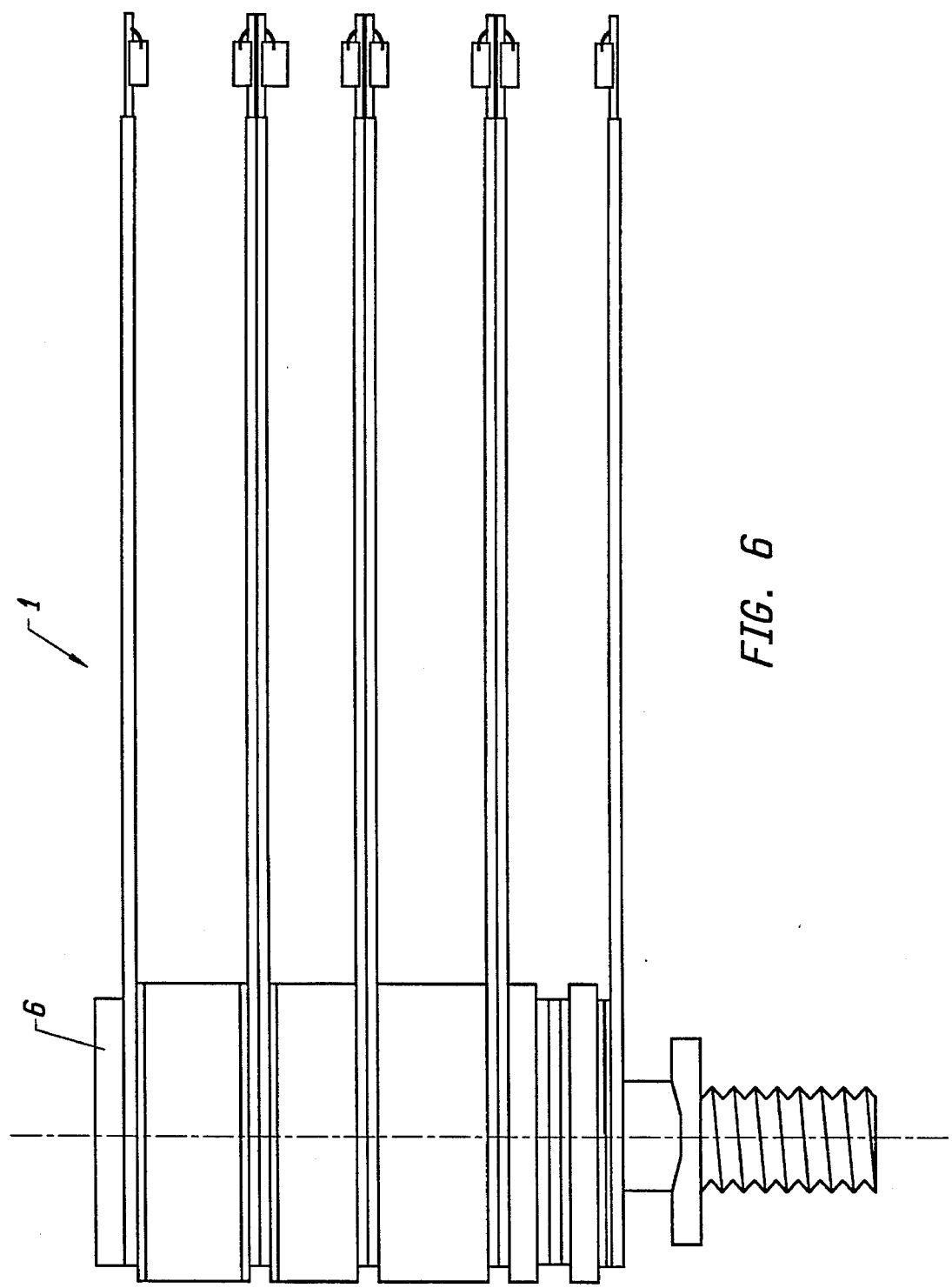
FIG. 6 is an edge view of an alternative embodiment of the present invention wherein the flexure and mounting support constitute a single unitary piece.

FIG. 6 shows an alternative embodiment of the present invention. Instead of having a separate flexure and separate mounting support to support the head gimbal assembly, a single unitary piece is used.

Figure 7:
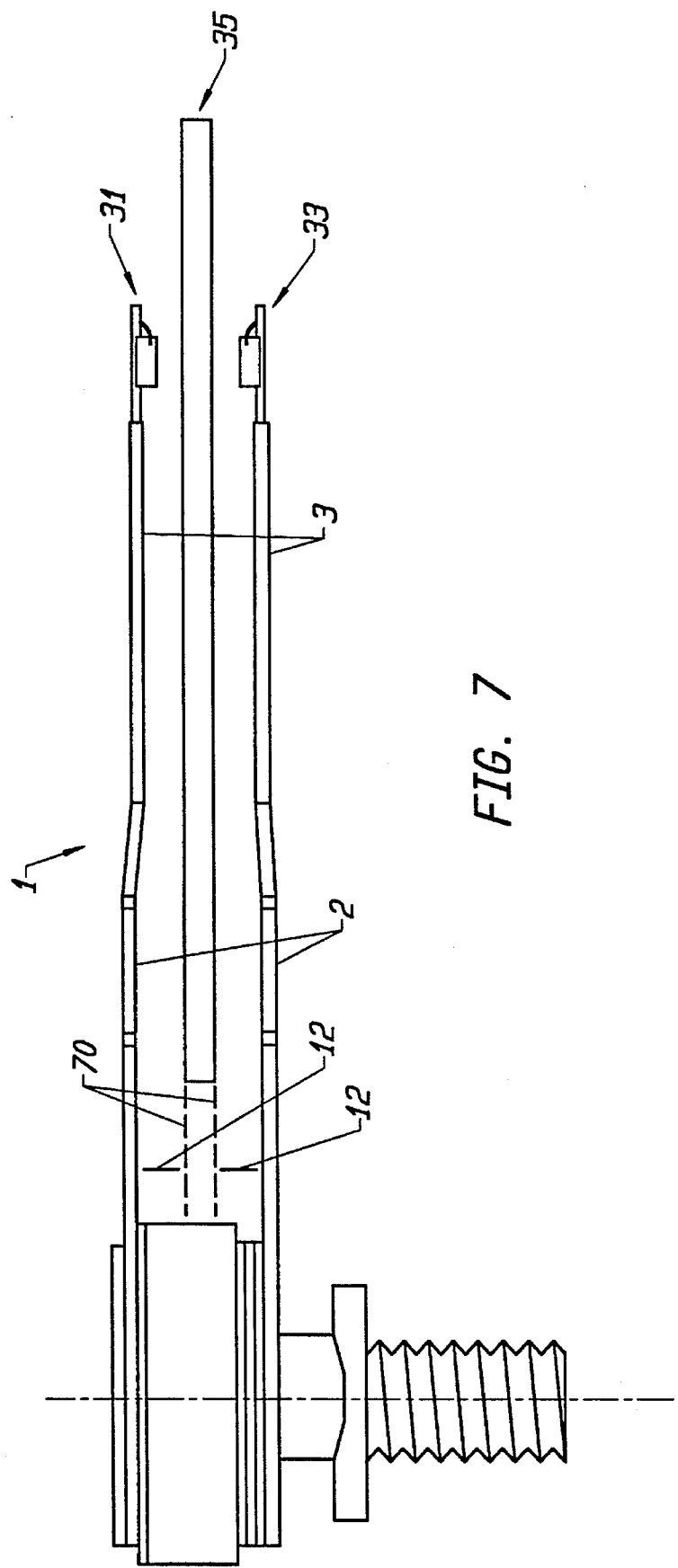
FIG. 7 is an edge view of an alternative embodiment of the present invention showing upper and lower outer actuator arms and no inner actuator arms.

FIG. 7 shows still another embodiment of the present invention. Typical in most single disc drive systems, only two actuator arms are installed—an outer upper actuator arm 31 and an outer lower actuator arm 33. Once again, the z-height 12 is measured from the mounting support 2 to the plane 70 of the memory disc surface. z-height arm compliance compensation of this invention is applicable to these arms as well.

The frequency response, as depicted in the Bode plots of FIGS. 8–13, shows one embodiment of the method used to determine the optimal stability of the disc drive system. The input is measured at the pivot end of the actuator arm. When a series of vibrations of a certain magnitude at a range of frequencies are entered into the system at the pivot end, an output is measured at the head gimbal assembly. The term "optimal" is relative only and should not be construed to mean that the achieved stability is the most optimal. In fact, a composite frequency response measurement of the inner and outer actuator arms must be made for at least two different z-heights $z_n$. The "optimal" z-height, or $z_{opt}$, is one of the z-height $z_n$ that achieves the "best" composite frequency response. The subscript "n" refers to a particular z-height used during one of the measurements and can take on any positive or negative integer value. The accompanying phase plots are used as a "check" to make sure that the output readings correspond to the appropriate input signal.

Initially, the inner actuator arms must be installed. In this particular embodiment, the inner actuator arms are installed in a back-to-back configuration. As mentioned earlier, the back-to-back contact of the inner actuator arms is rigid and substantially without resiliency. Such a configuration prevents deflection of the inner actuator arms because each arm resists the force applied by the other arm. z-height compensation, in accordance with this invention, is inapplicable to the inner actuator arms with back-to-back configuration.

Figure 14:
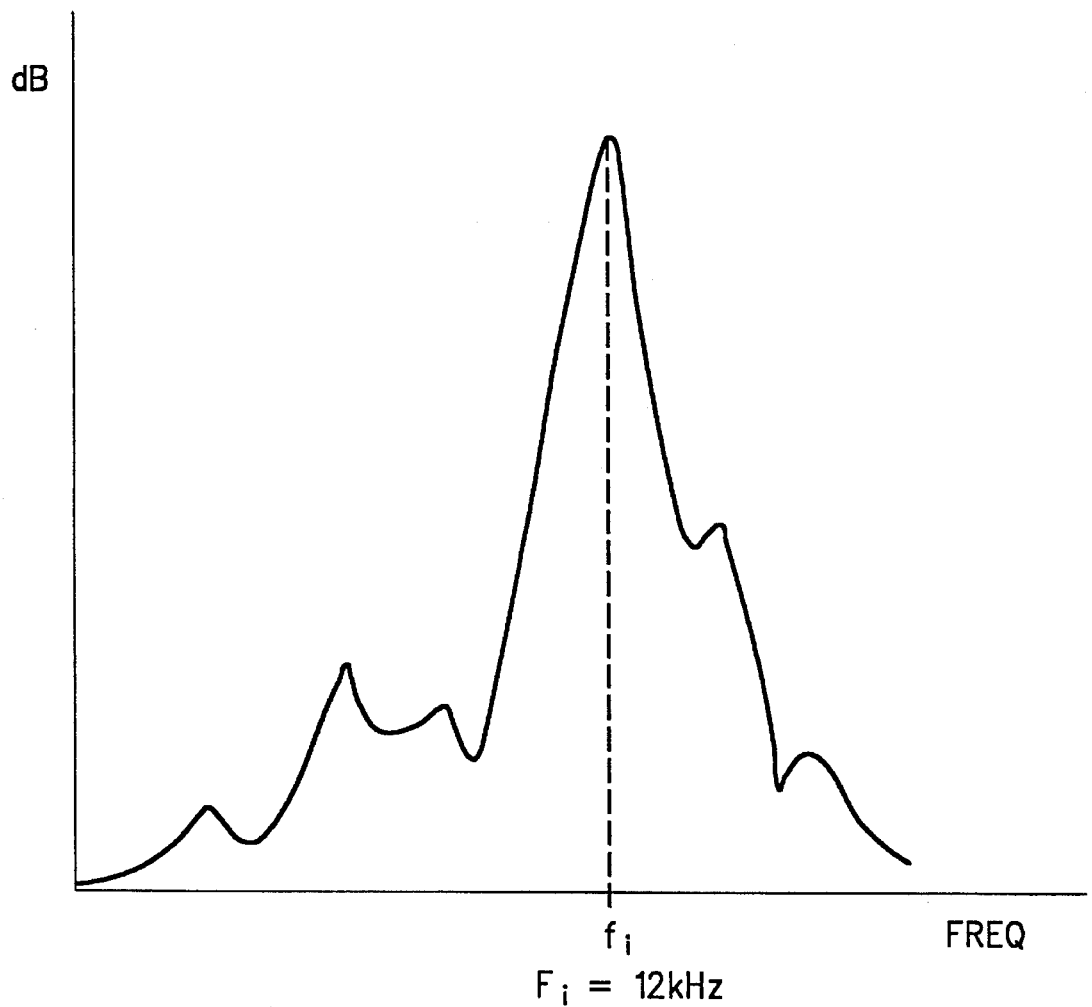

Once installed, a frequency response in the form of Bode plots is generated for the inner actuator arms. FIG. 14 shows one such Bode plot. A peak magnitude resonance occurs at $f_i$. This value of $f_i$ is used in subsequent measurements for comparison purposes.

The outer actuator arms, both upper and lower, are installed at a specific initial z-height $z_0$. $z_0$ corresponds to the z-height $z_n$, where n=0. In some cases, the z-height for the outer upper actuator arm will be different from that of the outer lower actuator arm. The frequency response for each outer actuator arm is generated. The frequency at which the peak magnitude resonance occurs is denoted $f_0$. $f_0$ corresponds to the frequency $f_n$ where n=0. The condition n=0 corresponds to the initial condition.

At this point, the remainder of the measurements are obtained in a methodical manner by selecting an incremental value for each z-height. Selecting $z_{inc}$= 0.005 inch allows measurements of the composite frequency response at each 0.005 inch increment. Needless to say, $z_{inc}$ could be any value.

For example, FIG. 10 shows that at $z_0$=0.023 inch, a particular frequency response for the outer actuator arms is generated. After noting the frequency, $f_0$ (6.346 kHz), at which the peak magnitude resonance occurs, $z_n$ is incremented by $z_{inc}$=0.005 inch to obtain $z_1$=0.028 inch ($z_1z_0$+ $z_{inc}$). FIG. 10 shows a plot for $z_1$=0.028 inch. Here, $f_1$=6.3826 kHz.

At the next increment, $z_2$=0.033. As shown in FIG. 12, $f_2$=6.4195 kHz. In FIG. 13, $z_3$=0.038 inch for the next increment and $f_3$=6.4565 kHz. One may either stop at this point or obtain more frequency responses for $z_n$ above and/or below the initial z-height $z_0$. For z-heights below $z_0$, n is a negative integer. The same incremental value $z_{inc}$ may be used or values for $z_n$ may be selected that are lower than $z_0$.

A couple of frequency response plots for z-height $z_n$ less than $z_0$ was made for the outer actuator arms. In these plots, the incremental value of 0.005 inch was not used. Rather, two different z-heights less than $z_0$ were selected. FIG. 8 shows a plot for $z_n$=0.013 inch. Here, $f_n$=6.3643 kHz. FIG. 9 shows $z_n$=0.0205 inch and $f_n$=11.519 kHz.

Of all the outer actuator arm plots represented by FIGS. 8–13, $f_i$ of the inner actuator arm ($f_i$=12 kHz) is closest to $f_n$=11.519 kHz (FIG. 9), which corresponds to z-height $z_n$=0.0205 inch. Accordingly, for this set of measurements, the optimal z-height is 0.0205 inch. For other actuator arms and disc drives, the z-height will be different. For other sets of measurements, a different optimal z-height may be obtained. For example, if additional measurements were made for the disc drive system utilized in FIGS. 8–14, a "more optimal" z-height lying close to 0.0205 inch may be found.

Even without a reference as shown in FIG. 14, optimum z-height $z_{opt}$ may be obtained by selecting the particular z-height $z_n$ that is associated with the highest peak magnitude resonance frequency $f_n$.

z-height compensation is also applicable to those disc drive systems containing no inner actuator arms, as shown in FIG. 7. Since no inner actuator arms with a static resonance characteristic exists, no set reference value can be used. Instead, arm compliance compensation is achieved by measuring the frequency response at each z-height $z_n$ for one or both outer actuator arms.

For one outer actuator arm, the frequency response and hence, the peak magnitude resonance frequency $f_n$ are obtained for each $z_n$. When all desired $z_n$ measurements are made, the optimum z-height $z_{opt}$ is the particular z-height $z_n$ associated with the greatest peak magnitude frequency $f_n$.

For two outer actuator arms, the frequency response and the peak magnitude resonance frequency $f_n$ are obtained for all desired z-heights $z_n$. As shown in FIG. 15(a), a composite frequency response at a particular z-height $z_n$ shows an outer upper arm with frequency $f_u(z_n)$ and an outer lower arm with frequency $f_L(z_n)$. FIG. 15(a) is exaggerated to show $\Delta f_n$. A separation $\Delta f_n$ is determined. Similar responses and hence, separations, are obtained at different z-height $z_n$. The optimum z-height $z_{opt}$ is obtained by observing the z-height $z_n$ that is associated with the greatest frequency $f_u(z_n)$ or $f_L(z_n)$. If more than one z-height measurements provide identical peak magnitude frequency $f_n$, then, in one embodiment, the separation is used as the tiebreaker. In this embodiment, the z-height resulting in the smallest separation $\Delta f_n$ is the optimum z-height. Notice that the separation is only used as a tiebreaker of multiple z-heights $z_n$ with identical $f_n$. For example, FIG. 15(b) shows a separation $\Delta f_n$ that is greater than the separation $\Delta f_n$ of FIG. 15(a). Note that FIG. 15(b) has been exaggerated to clearly show the separation $\Delta f_n$. However, the peak magnitude frequency $f_n$ for the set of actuator arms at this z-height in FIG. 15(b) is greater than the frequency $f_n$ at the z-height of FIG. 15(a). Thus, the optimum z-height is the z-height of FIG. 15(b).

Alternatively, one could obtain optimal z-height by comparing gram loads on the head gimbal assemblies. Since the gram loads on the head gimbal assemblies for the inner actuator arms are preset, the task is to match as closely as possible the gram loads on the head gimbal assembly of the outer actuator arm with the gram loads of the head gimbal assembly of the inner actuator arms. At each $z_n$, the head gimbal assembly should make contact with the disc surface when the disc is not rotating. That contact results in a specific gram load on the head gimbal assembly. Some deflection on the mounting support occurs due to this gram load. The goal is to select that $z_n$ such that the corresponding gram load on the head gimbal assembly of the outer actuator arms is most close to the gram load on the head gimbal assembly of the inner actuator arms.

Although the present invention has been described with reference to a particular embodiment, additional embodiments, applications, and modifications that are obvious to those skilled in the art or are equivalent to the disclosure are included within the spirit and scope of the invention. For example, the mounting support could be comprised of more than one piece. Therefore, this invention should not be limited to the specific embodiment discussed and illustrated herein, but rather by the following claims and equivalents thereof.

We claim:

1. A method of installing actuator arms in a dynamic magnetic information storage and retrieval disc drive system, wherein each of said arms is associated with a mounting support, with a head gimbal assembly, and with a surface of a memory disc, the method comprising the following steps:

installing an outer actuator arm at a z-height $z_n$ where $z_n$ represents distance of an associated said mounting support from a plane of an associated said memory disc surface, and n is an integer denoting a particular increment;

applying a particular gram load to a said head gimbal assembly associated with said outer actuator arm to simulate an actual gram load applied by a said memory disc at each different z-height $z_n$;

measuring frequency response of said outer actuator arm at a plurality of different z-heights $z_n$ and determining therefrom a peak magnitude resonance, $f_n$, of said outer actuator arm for each z-height $z_n$;

selecting an optimum z-height $z_{opt}$ of said outer actuator arm using information obtained from the step of measuring and determining; and maintaining each said outer actuator arm at said optimum z-height $z_{opt}$.

2. A method of installing actuator arms in a disc drive system as in claim 1, wherein optimum z-height $z_{opt}$ is selected by comparing all frequency response readings and peak magnitude resonance frequencies $f_n$ at each $z_n$;

wherein $z_{opt}$ is a value of $z_n$ associated with a largest peak magnitude resonance frequency $f_n$.

3. A method of installing actuator arms in a disc drive system as in claim 1, wherein optimum z-height $z_{opt}$ is selected by:

comparing all frequency response readings for all outer actuator arms at each determining separation $\Delta f_n$ of peak magnitude resonance frequencies $f_n$ at each $z_n$; and selecting a $z_n$, where $z_n = z_{opt}$, associated with a smallest $\Delta f_n$ using information obtained from the step of determining.

4. A method of installing actuator arms in a dynamic magnetic information storage and retrieval disc drive system, wherein each of said arms is associated with a mounting support, with a head gimbal assembly, and with a surface of a memory disc, the method comprising the following steps:

installing at least two inner actuator arms;

applying a particular gram load to a said head gimbal assembly associated with a said inner actuator arm to simulate an actual gram load applied by a said memory disc;

measuring frequency response of a said inner actuator arm and determining therefrom whereat peak magnitude resonance, $f_i$, of said inner actuator arms occurs;

installing outer actuator arms at a z-height $z_n$, where $z_n$ represents distance of an associated said mounting support from a plane of an associated said memory disc surface, and n is an integer denoting a particular increment;

applying a particular gram load to a said head gimbal assembly of a said outer actuator arm to simulate actual gram load applied by a said memory disc at each z-height $z_n$;

measuring frequency response of said outer actuator arms for a plurality of z-heights $z_n$ and determining therefrom whereat peak magnitude resonance, $f_n$ of said outer actuator arms occur at each z-height $z_n$;

selecting an optimum z-height $z_{opt}$ for said outer actuator arm using information obtained from the step of measuring and determining; and maintaining each said outer actuator arm at a selected said optimum z-height $z_{opt}$.

5. A method of installing actuator arms in a disc drive system as in claim 4, wherein optimum z-height $z_{opt}$ is selected by:

comparing all peak magnitude resonance frequencies, $f_n$, of said outer actuator arm at each $z_n$ with a peak magnitude resonance frequency of said inner actuator arm, $f_i$; and selecting a $z_n$, where $z_n = z_{opt}$, associated with a $f_n$ closest in frequency to $f_i$ using information obtained from the step of comparing.

6. A method of installing actuator arms in a disc drive system as in claim 4, wherein optimum z-height $z_{opt}$ is selected by comparing all frequency response readings and peak magnitude resonance frequencies $f_n$ at each $z_n$, wherein $z_{opt}$ is a value of $z_n$ associated with a largest peak magnitude resonance frequency $f_n$.

7. A method of installing actuator arms for a disc drive system as in claim 4, further comprising the following steps:

selecting an incremental z-height value $z_{inc}$; and measuring frequency response of said outer actuator arms and determining therefrom whereat peak magnitude resonance $f_n$ of said outer actuator arms occurs at each z-height $z_n$, where $z_n = z_o + n z_{inc}$, $z_o$ is an initial value of z-height $z_n$ (n=o), n is an integer $\{\ldots, -2, -1, 0, 1, 2, \ldots\}$, and a set of $z_n$ is finite.

8. A method of installing actuator arms for a disc drive system as in claim 7 wherein $z_{inc} = 0.005$ inch.

9. A method of installing actuator arms for a disc drive system as in claim 4, wherein every pair of said inner actuator arms disposed between adjacent said memory discs are in contact with each other in a back-to-back configuration.

10. A method of installing actuator arms in a dynamic magnetic information storage and retrieval disc drive system, wherein each of said arms is associated with a mounting support, with a head gimbal assembly, and with a surface of a memory disc, the method comprising the following steps:

installing inner actuator arms;

applying a particular gram load $l_i$ to said head gimbal assembly of said inner actuator arms, wherein $l_i$ simulates an actual gram load applied by a said memory disc;

installing outer actuator arms at more than one particular z-height $z_n$;

measuring gram load $l_n$ applied by said memory disc to each head gimbal assembly associated with said outer actuator arms at each z-height $z_n$;

selecting and maintaining an optimum z-height $z_{opt}$, where of all $l_n$ measured at each $z_n$, $z_{opt} = z_n$ where $l_i$ is closest in value to $l_n$.

* * * * *